United States Patent
Ballagh et al.

(10) Patent No.: US 8,947,452 B1
(45) Date of Patent: Feb. 3, 2015

(54) MECHANISM FOR DISPLAYING VISUAL CLUES TO STACKING ORDER DURING A DRAG AND DROP OPERATION

(75) Inventors: Jonathan B. Ballagh, Boulder, CO (US); Thomas E. Fischaber, Golden, CO (US); Roger B. Milne, Boulder, CO (US); Krista M. Marks, Boulder, CO (US)

(73) Assignee: Disney Enterprises, Inc., Burbank, CA (US)

(*) Notice: Subject to any disclaimer, the term of this patent is extended or adjusted under 35 U.S.C. 154(b) by 995 days.

(21) Appl. No.: 11/999,616

(22) Filed: Dec. 6, 2007

Related U.S. Application Data

(60) Provisional application No. 60/873,392, filed on Dec. 7, 2006.

(51) Int. Cl.
*G09G 5/00* (2006.01)

(52) U.S. Cl.
USPC ............ 345/629; 345/619; 345/426; 345/420; 345/421; 345/422; 345/642; 715/853; 715/764; 715/866; 715/804; 715/839; 715/835; 715/967

(58) Field of Classification Search
CPC ............... G09G 5/14; G09G 2340/10; G09G 2340/125; G06T 11/60; G06T 15/503
USPC .................. 345/418–689; 715/200–866, 967
See application file for complete search history.

(56) References Cited

U.S. PATENT DOCUMENTS

| | | | | |
|---|---|---|---|---|
| 4,931,783 A | | 6/1990 | Atkinson | |
| 5,361,081 A | * | 11/1994 | Barnaby | 715/857 |
| 5,515,496 A | | 5/1996 | Kaehler | |
| 5,594,850 A | * | 1/1997 | Noyama et al. | 345/632 |
| 5,625,766 A | * | 4/1997 | Kauffman | 382/294 |
| 5,805,163 A | * | 9/1998 | Bagnas | 715/768 |
| 5,923,333 A | * | 7/1999 | Stroyan | 345/422 |
| 5,973,702 A | * | 10/1999 | Orton et al. | 345/619 |
| 5,995,670 A | * | 11/1999 | Zabinsky | 382/242 |
| 5,999,191 A | * | 12/1999 | Frank et al. | 345/634 |
| 6,320,580 B1 | * | 11/2001 | Yasui et al. | 345/421 |
| 6,384,840 B1 | * | 5/2002 | Frank et al. | 345/634 |
| 6,429,874 B1 | * | 8/2002 | Miura | 345/589 |
| 6,597,383 B1 | * | 7/2003 | Saito | 715/860 |
| 6,680,734 B2 | * | 1/2004 | Kobayashi | 345/422 |
| 6,694,486 B2 | * | 2/2004 | Frank et al. | 715/203 |
| 6,819,345 B1 | * | 11/2004 | Jones et al. | 715/856 |
| 7,046,254 B2 | * | 5/2006 | Brown et al. | 345/592 |
| 7,068,294 B2 | * | 6/2006 | Kidney et al. | 715/700 |
| 7,216,300 B2 | * | 5/2007 | Dang | 715/783 |
| 7,256,798 B2 | * | 8/2007 | Bourdev et al. | 345/619 |
| 7,495,675 B1 | * | 2/2009 | Bourdev et al. | 345/629 |
| 7,571,219 B2 | * | 8/2009 | Cejka et al. | 709/219 |

(Continued)

*Primary Examiner* — Abderrahim Merouan
(74) *Attorney, Agent, or Firm* — Farjami & Farjami LLP

(57) ABSTRACT

Disclosed are various approaches for displaying graphical objects. In one approach, first and second graphical objects are displayed in a first state. In the first state a portion of the second graphical object that is overlapped by a portion of the first graphical object is completely obstructed from view by the portion of the first graphical object. When in a second state, the first and second graphical objects are displayed in a manner different from the first state. In the second state the portion of the second graphical object that is overlapped by the portion of the first graphical object is represented as being visible along with the portion of the first object and with muted visibility relative to a portion of the second graphical object that is not overlapped by a portion of the first graphical object.

20 Claims, 14 Drawing Sheets

(56) References Cited

U.S. PATENT DOCUMENTS

| | | | |
|---|---|---|---|
| 7,692,652 B2* | 4/2010 | Parenteau et al. | 345/426 |
| 7,703,011 B2* | 4/2010 | Yamakado et al. | 715/243 |
| 7,747,077 B2* | 6/2010 | Murakami | 382/180 |
| 8,510,675 B1* | 8/2013 | Jitkoff et al. | 715/788 |
| 2002/0171682 A1* | 11/2002 | Frank et al. | 345/790 |
| 2003/0142138 A1* | 7/2003 | Brown et al. | 345/797 |
| 2003/0160824 A1* | 8/2003 | Szumla | 345/769 |
| 2004/0261037 A1* | 12/2004 | Ording et al. | 715/788 |
| 2005/0091223 A1* | 4/2005 | Shaw et al. | 707/100 |
| 2006/0023940 A1* | 2/2006 | Katsuyama | 382/165 |
| 2006/0041564 A1* | 2/2006 | Jain et al. | 707/100 |
| 2006/0074870 A1 | 4/2006 | Brill | |
| 2006/0088160 A1* | 4/2006 | Brown et al. | 380/51 |
| 2006/0168540 A1* | 7/2006 | Cejka et al. | 715/786 |
| 2006/0206835 A1* | 9/2006 | Chaudhri et al. | 715/781 |
| 2006/0214935 A1* | 9/2006 | Boyd et al. | 345/473 |
| 2007/0101282 A1* | 5/2007 | Goossen et al. | 715/764 |
| 2007/0113198 A1* | 5/2007 | Robertson et al. | 715/790 |
| 2007/0126732 A1* | 6/2007 | Robertson et al. | 345/419 |
| 2008/0071559 A1* | 3/2008 | Arrasvuori | 705/1 |

* cited by examiner

MECHANISM FOR DISPLAYING VISUAL CLUES TO STACKING ORDER DURING A DRAG AND DROP OPERATION

RELATED PATENT DOCUMENTS

This patent document claims the benefit, under 35 U.S.C. §119(e), of U.S. Provisional Patent Application No. 60/873,392, filed Dec. 7, 2006 and entitled: "MECHANISM FOR VISUALIZING STACKING ORDER DURING A DRAG AND DROP OPERATION," which is fully incorporated herein by reference.

TECHNICAL FIELD

The present invention relates to computer systems and more specifically to displaying visual clues of the stacking order and relative occlusion of graphical objects during a drag and drop operation.

BACKGROUND

Two-dimensional computer-aided design and graphic arts programs ("graphics applications"), such as VISIO® and MICROSOFT OFFICE® (WORD®, POWER POINT®), by Microsoft Corporation, of Redmond, Wash., and ADOBE ILLUSTRATOR®, by Adobe Systems Incorporated, of San Jose, Calif., generally allow users to organize their designs and artwork into layers, analogous to sheets of acetate bound together. Each object on a layer occupies a stacking order such that objects can be on top of one another. Similarly, layers are also stacked on top of one another to form the final work. The final work is rendered as a two dimensional design to be viewed on a video display, printed, etc. To the extent that one or more graphical objects are layered over other graphical objects, some graphical objects may be partially or fully occluded in the rendered two dimensional design. Programs conventionally provide a mechanism to reorder object layering (e.g. via menu controls to "bring to front", "send to back", etc.) Some programs also provide a "layers palette"—a taxonomical tree of the layer identifiers—allowing the user to select the layer on which to draw, reorder the layers by dragging and dropping them with the mouse, and move art from one layer to another.

Prior art exists to make the concept and application of a "layers palette" somewhat less burdensome. Specifically, prior art provide the user with a visual representation—a thumbnail—of each graphic object in the design next to the corresponding layer in a taxonomy tree. The user can readily see which object in the drawing corresponds to a particular layer or row in the layers palette by recognizing the appearance of the object in the document through a thumbnail image. The user can place and manage layers inside layers, which removes some of the burden on a user when organizing complex documents.

Graphics applications have evolved to provide many different kinds of options to developers. Graphics applications allow developers not only the ability to create graphical objects, such as a depiction of a person, a table, an animal, but also the ability to place them into scenes. As used herein, the term "graphical object" is an object in a graphics application that includes features that can be manipulated by the graphics application. Often, graphical objects are depicted as being part of a scene. Generally, a scene is a rendered object that includes a background and graphical objects in front of the background.

Drag and drop is an important feature in graphics arts programs. A "drag and drop" operation refers to an operation currently most often performed with a mouse button but which can be performed with other user input devices with similar controls. In a mouse-based drag and drop operation the user selects a screen object by using a mouse to position a mouse indicator to point at a screen object, depresses a button on the mouse ("mouse button"), uses the mouse to move the selected screen object to a destination and releases the mouse button to drop the screen object on the destination. Typically, after releasing the mouse button, the screen object appears to have moved from where it was first located to the destination. The term "screen objects" refers generally to any object displayed on a video display, including graphical objects. Visual effects during drag and drop operation are intended to make an impression that the source object is being "dragged" across the screen to the destination object. These visual effects can include an image located under the mouse pointer.

The prior art has several shortcomings, in that controls for manipulation of stacking order are less than intuitive and in that visual displays during drag-and-drop and other manipulations of layered objects do not convey to the user sufficient information about the layering. These shortcomings impact the productivity of expert users of graphics applications and can severely limit the ability of users with little or no computer knowledge to use such applications.

DETAILED DESCRIPTION

Figure 1:
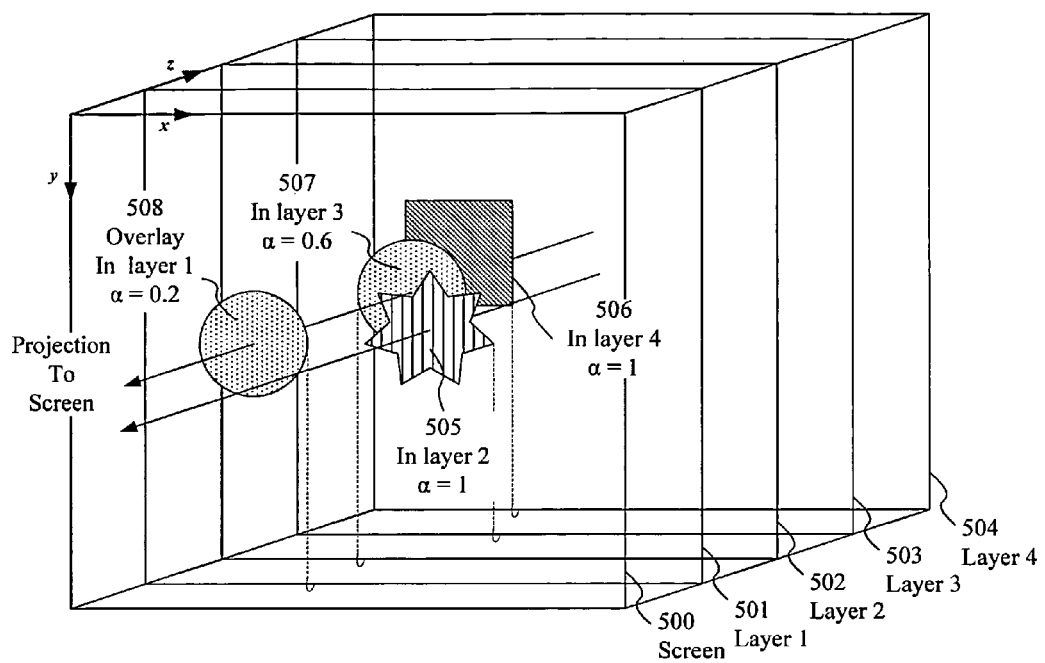
FIG. 1 illustrates an example method and apparatus for displaying a temporary projection of a graphical object while it is being dragged in a graphics application.

The various embodiments of the present invention are now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing embodiments of the invention.

As used in this description, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be considered a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the specific set of data subject to change and associated with the execution of the thread. A thread's context includes the contents of system registers and the virtual address belonging to the thread's process. Thus, the actual data comprising a thread's context varies as it executes.

The various embodiments of the invention allow the relative stacking layer and any resultant state of occlusion of a graphical object to be visible during a drag and drop operation in a computer software environment and for the stacking layer to be manipulated efficiently and expeditiously both by users skilled in modern computer use and by users with little or no computer knowledge. Graphical objects may include any software object, for example, desktop windows, web browser images, and user toolbars, that is presented visually to users on an output screen using at least one image.

Graphical user interfaces (GUIs), pointers, pointer selection, pointer-based dragging operations, and "drag-and-drop" operations are well known and understood by those skilled in the art. For the purpose of concise illustration, the embodiments of the invention are described in the context of a pointing device which is a mouse and the associated terminology of "mouse", "mouse button", "drag and drop". It is to be understood the pointer is controlled by a user input device, for example, a mouse or other tactile device such as a touch pad, touch screen, track ball, eye tracking, brain wave monitoring, etc. The method of this invention may be activated by selecting a graphical object with such a pointing device, and for the remainder of this disclosure, such a user input device will be referred to as pointing device or simply as a mouse.

In an embodiment of the invention, the graphical object may be selected by clicking or clicking and dragging the mouse. Once selected by the mouse, the relative stacking layer and occlusion of the graphical object may be visually indicated by an appearance of transparency of other graphical objects occupying overlapping screen regions. When the selected object is behind another object, the selected object may appear to be faintly visible through the object located in front. When the selected object is in front of another object, the selected object may remain opaque in the overlapping screen region(s). In this way, visual clues may be given such that the stacking order of the selected object in relation to other objects and the graphical effects of the same are immediately apparent to the user.

Figure 2:
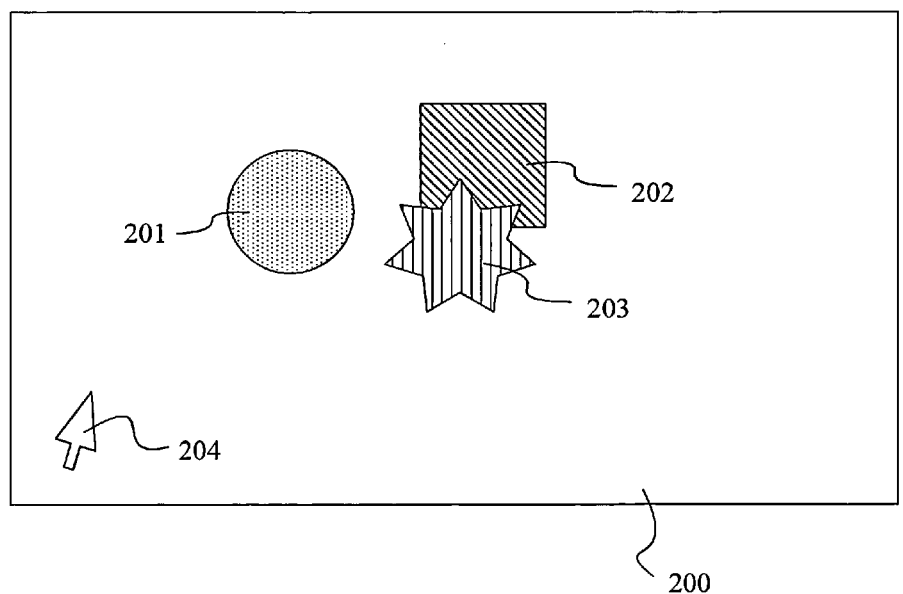
FIG. 2 is a view of computer display device including three example graphical objects with two of the objects intersecting.

FIG. 2 is a view of computer display device including three example graphical objects with two of the objects intersecting. In an embodiment of the invention, a projection onto a screen of desktop environment 200 is displayed containing a user input pointer 204 and three graphical objects: graphical object 201 ("circle" 201), graphical object 202 ("square" 202), and graphical object 203 ("star" 203). Graphical objects 201, 202, and 203 are shown in a state in which none of the three graphical objects have been selected by mouse pointer 204.

Figure 3:
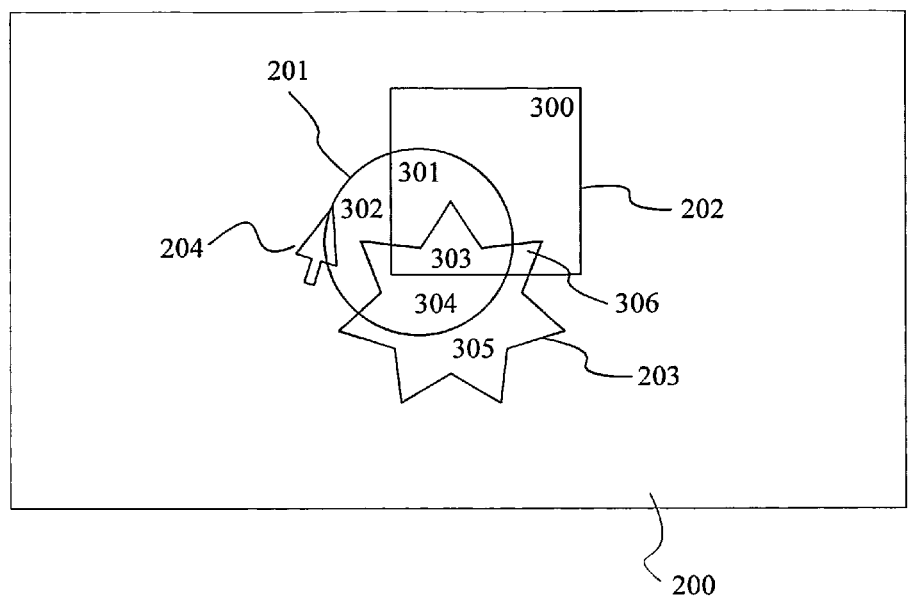
FIG. 3 shows an abstract view of a computer display device having displayed thereon three example intersecting graphical objects with each region of intersection identified in order to explain the visual mechanism for indicating the stacking layer of each graphical object during a drag operation.
Figure 5:
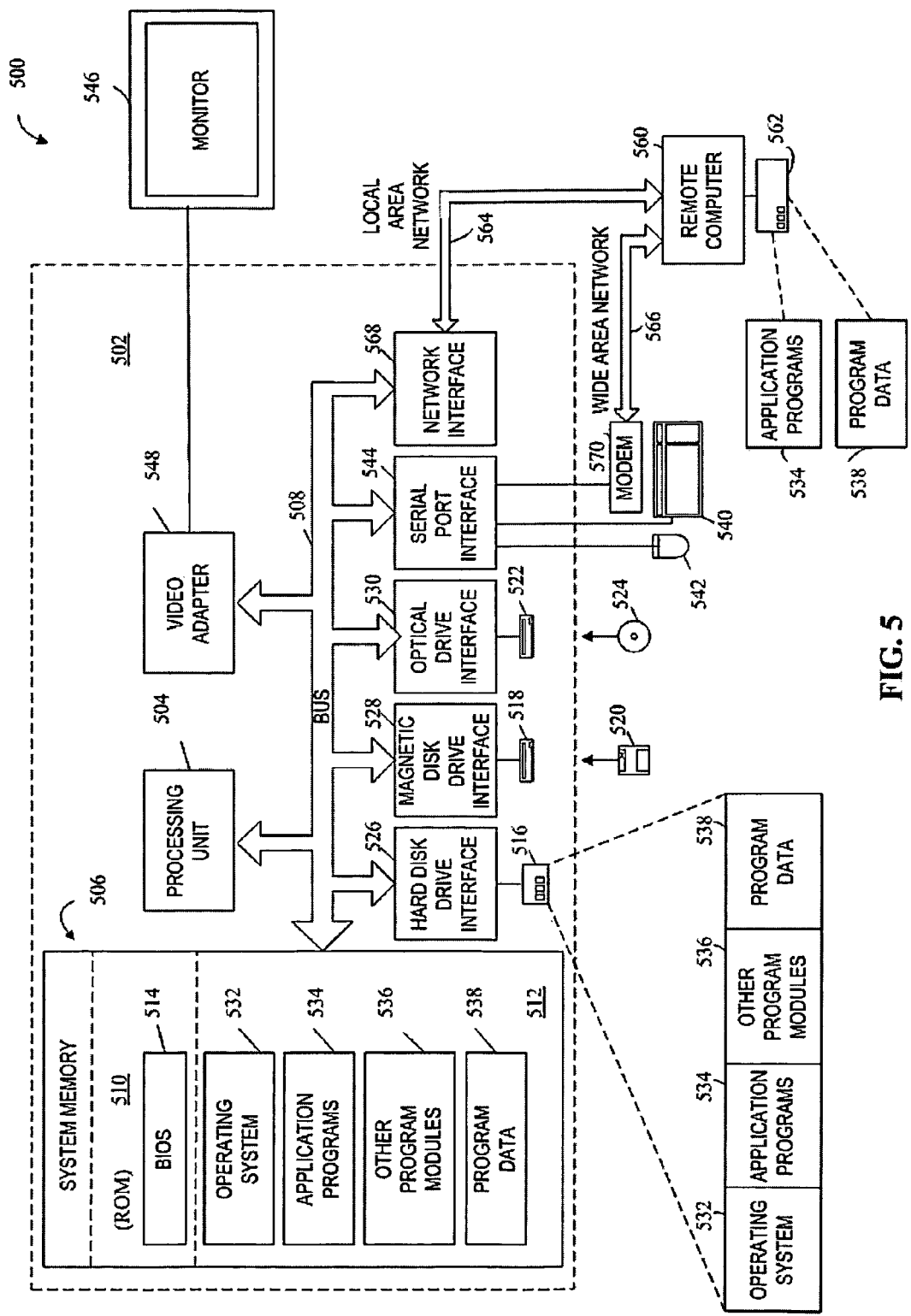
FIG. 5 illustrates an example operating environment in which an embodiment of the present invention can function.

FIG. 3 depicts three example intersecting graphical objects 201, 202, and 203 in a representation of their projection onto the screen of a graphical display 546 (FIG. 5) as in environment 200. One of the graphical objects, circle 201, is currently selected by mouse pointer 204 and has been dragged horizontally along the x-axis of its layer to intersect with star 203 and square 202. FIG. 3 further identifies each intersecting region 301-306 in order to illustrate the behavior of each region during a drag operation. In this state, screen regions 301-306 behave as follows:

In screen region 300, square 202 does not intersect with circle 201 or star 203. Therefore, the portion of square 202 in screen region 300 may appear as in prior art as an opaque image on the graphical display 546 (FIG. 5).

In screen region 301, circle 201 intersects with square 202 but does not intersect with star 203. Circle 201 has been selected and is being dragged in front of square 202. In this state, the intersecting region 301 may be shown as an opaque region of circle 201. This may enable the user to understand from the displayed visual clues, readily and in real-time, that circle 201 is being dragged in front of square 202—in other words, this may enable the user to visualize the place in the stacking order of the selected graphical circle 201.

In screen region 302, circle 201 does not intersect with square 202 or star 203. The section of circle 201 that occupies screen region 302 may be highlighted, altered in color, or otherwise modified visually in order to enable the user to readily identify that circle 201 is currently selected by the mouse 204 or that it is being dragged, etc. Circle 201 may be depicted as opaque and unaltered in Screen region 302, as it conventionally is in the prior art.

In screen region 303, circle 201, square 202 and star 203 all intersect. Circle 201 has been selected and is being dragged behind star 203, but in front of square 202. In this state, the portion of star 203 contained in screen region 303 may appear partially transparent so that a faint view of the portion of the circle 201 in screen region 303 is visible. This representation may enable the user to understand from the displayed visual clues, readily and in real-time, that circle 201 is being dragged behind star 203 and in front of circle 202.

In screen region 304, circle 201 intersects with star 203 but does not intersect with square 202. Circle 201 has been selected and is being dragged behind star 203. In this state, the portion of star 203 contained in screen region 303 may appear partially transparent so that a faint view of the portion of the circle 201 in screen region 303 is visible. This representation may enable the user to understand from the displayed visual clues, readily and in real-time, that circle 201 is being dragged behind star 203.

In screen region 305, star 203 does not intersect with circle 201 or star 204. Therefore, the portion of star 203 in screen region 305 may appear as an opaque image on the graphical display 546.

In screen region 306, square 202 intersects with star 203 but does not intersect with circle 201. Since star 203 is in front of square 202 and since neither square 202 nor star 203 is selected or being dragged etc., the portion of star 203 contained in region 306 will appear opaque and the portion of square 202 contained in region 306 will not be visible. Such representations as are used in FIG. 3 are further described in the context of an example in FIGS. 7a-7f and the descriptive text below.

Figure 4:
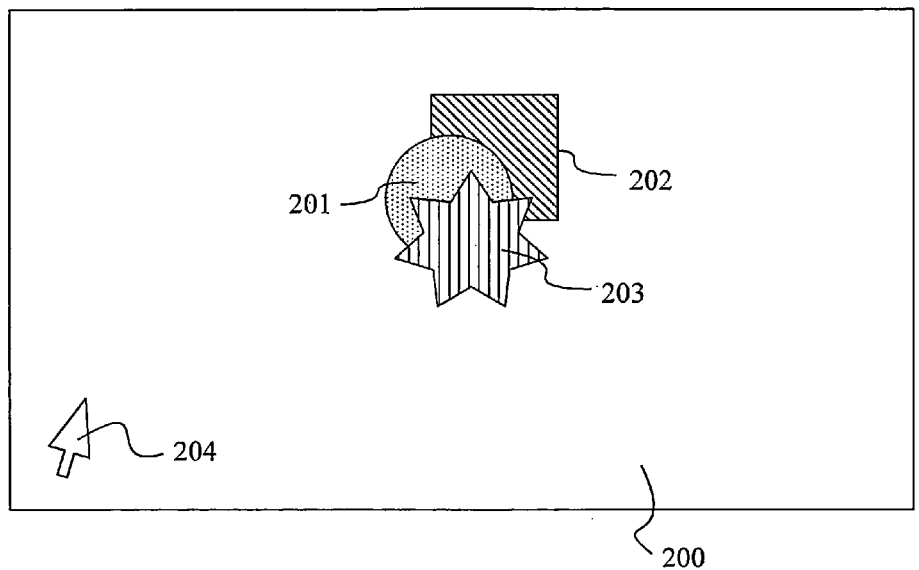
FIG. 4 is a view of a computer display device including three example intersecting graphical objects.

FIG. 4 depicts graphical objects 201, 202, and 203 after a drag and drop operation has been performed on circle 201. In FIG. 4, none of the three graphical objects are currently selected with the mouse 204. As will be understood by those skilled in the art, the graphical objects 201, 202, and 203 in FIG. 4 display visual properties standard to a relative stacking order of layered graphical objects. Graphical object 203, with a lower z-index than graphical objects 201 and 202, has the visual appearance of being in front of them. Similarly, graphical object 201, with a lower z-index than graphical object 202 but a higher z-index than graphical object 203, has the visual appearance of being in front of graphical object 202 but behind graphical object 203.

The foregoing descriptions of embodiments of the invention as applied to three graphical objects is sufficient in generality such that those skilled in the art will be able to apply the disclosed mechanisms to systems of arbitrarily many graphical objects.

To better illustrate a method by which graphical objects may be depicted in the manner displayed in FIG. 3, FIG. 1 is provided. In an embodiment of the invention, when graphical object 107 is selected, object-identical overlay 108 may be created and placed in layer 1 (101) above the graphical object and above one or more other graphical objects that occupy screen regions intersecting with graphical object 107. In FIG. 1, overlay 108 is shown in layer 1 (101), above object 105 in layer 2 (102) and above object 107 in layer 3 (103). In an embodiment of the invention as annotated in FIG. 1, object-identical overlay 108 may be given a largely transparent opacity setting, e.g., of α=0.2, meaning that it is partially (20%) transparent. Selected graphical object 107 may also be given a partially transparent opacity setting, e.g., setting, e.g., of α=0.6, meaning that it is partially (60%) transparent. Other opacity settings may be applied to graphical object 107 and overlay 108 within the spirit of the present invention, including an opacity α=1.0 to graphical object 107 (making it fully opaque). Those skilled in the art will realize that because the overlay 108 may be partially transparent and placed on a layer with a lower z-index than graphical objects 105 and 107, the details of these objects may be visible when the graphical objects 105-108 are projected onto two-dimensional screen 100 and rendered to graphical display device 546 (FIG. 5). Similarly, because graphical object 107 may be transparent, the portions of graphical object 106 that intersect with objects 107 and 108 when displayed on a two-dimensional screen 100 may be visible through both objects 107 and 108. Illustrations of some visual clues that may be made apparent by graphical objects such as overlay 108 are shown in FIGS. 7b-7d and FIG. 7f and described below. These figures present simplified screenshots that provide clarity by example of aspects of an embodiment of the present invention.

Figure 6:
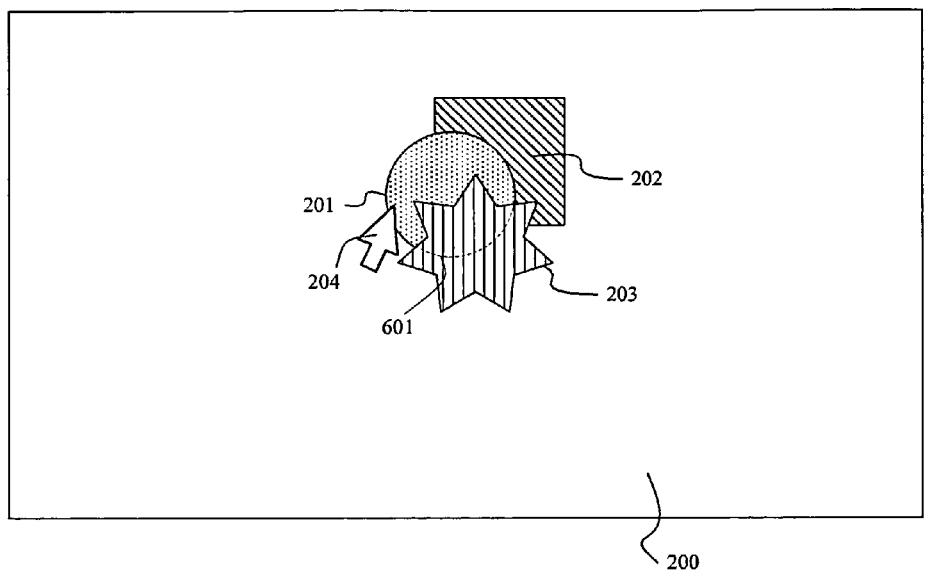
FIG. 6 is a view of a computer display device including three, intersecting graphical objects, and illustrating an aspect of an embodiment of the present invention.

In an embodiment of the present invention, graphical overlay 108 may be of a form derived from the form of graphical object 107 but not identical to graphical object 107. For example, graphical overlay 108 may be created by finding all pixels in a rendering of graphical object 107 that are on or near the boundary of the rendering of graphical object 107, where "on the boundary" may be defined as pixels that are bordered both by pixels whose alpha channel transparency settings exceed some particular value and by pixels whose alpha channel transparency settings are less than some second particular value, and setting such pixels in the graphical overlay object 108 to a dark, non-transparent color and all other pixels to transparent. In this way, only the boundary of graphical object 107 would appear to be visible "through" graphical object 105. Those skilled in the art will understand that many similarly derived overlays may be used to beneficial effect. Some but not all of such useful derived overlays include: one in which boundary lines (curves, etc.) of a rendering of graphical object 107 are found and replaced with dashed or dotted lines (an example being shown in FIG. 6 with an overlay applied to object 201, illustrating a dashed boundary 601 of one such form of overlay 108), one in which boundary lines are extended to include boundaries between automatically identifiable regions within a rendering of graphical object 107 (e.g., by such techniques commonly known in the art of computer vision such as image segmentation or edge detection), one in which fill regions within the boundary lines are filled with semi-transparent colors or patterns (e.g., cross-hashes), one in which such fill regions are filled with semi-transparent white pixels so as to give the appearance of a lightening of object 107 when overlay 108 is applied, one in which such fill regions are filled with semi-transparent black pixels so as to give the appearance of a darkening of object 107 when overlay 108 is applied, and one in which such fill regions are filled with partially-transparent colors derived from fill-colors of a rendering of graphical object 107 but with the derived colors having the same hue and intensity but increased saturation so as to give the appearance of a richening of colors when overlay 108 is applied. In an embodiment of the invention, such derivative graphical objects may be created for a library of graphical objects delivered with or by a software application (e.g., as clip-art) and a library of derivative graphical objects for overlaying delivered alongside the first said library of graphical objects.

Turning now to FIGS. 7a-7f, 8 and 9, some aspects of the forgoing and following descriptions of embodiments of the invention may be made clearer by the sequence of drawings presented in these figures. These figures present simplified drawings that are meant to be interpreted as views of a portion of a screen of a monitor 546 (FIG. 5). Each of the figures may represent a partial view of the display of a graphical application, e.g., a portion of an application window in a windowing environment, such as will be well known to those skilled in the art. These figures are analogous to what are commonly called "screenshots" by those skilled in the art. In these figures, the simplified drawings use hatching and cross hatching to illustrate aspects of embodiments of the invention (e.g., the effect of semi-transparent overlays). These figures use hatching to represent contrast levels to facilitate electronic reproduction of the figures. Those skilled in the art will understand that more subtle visual effects and layering clues may be achieved by embodiments of the invention, beyond what is shown in these figures, and also through the use of colors. Each figure shows a display region 701a-f, 801, and 901 that contains a graphical scene that is being modified in the context of a graphical user interface (GUI). For brevity, the display regions 701a-f, 801, and 901 containing the graphical scenes are hereafter called scenes 701a-f, 801 and 901. While the example scene chosen for illustration shows what might be called a "landscape rendering" with visual clues for perspective and "depth," it will be understood by those skilled in the art that such particular choices have only been made for the purpose of clarity by example and in no way indicate that the utility of the invention is in any way limited to such scenarios or considerations.

Figure 7A:
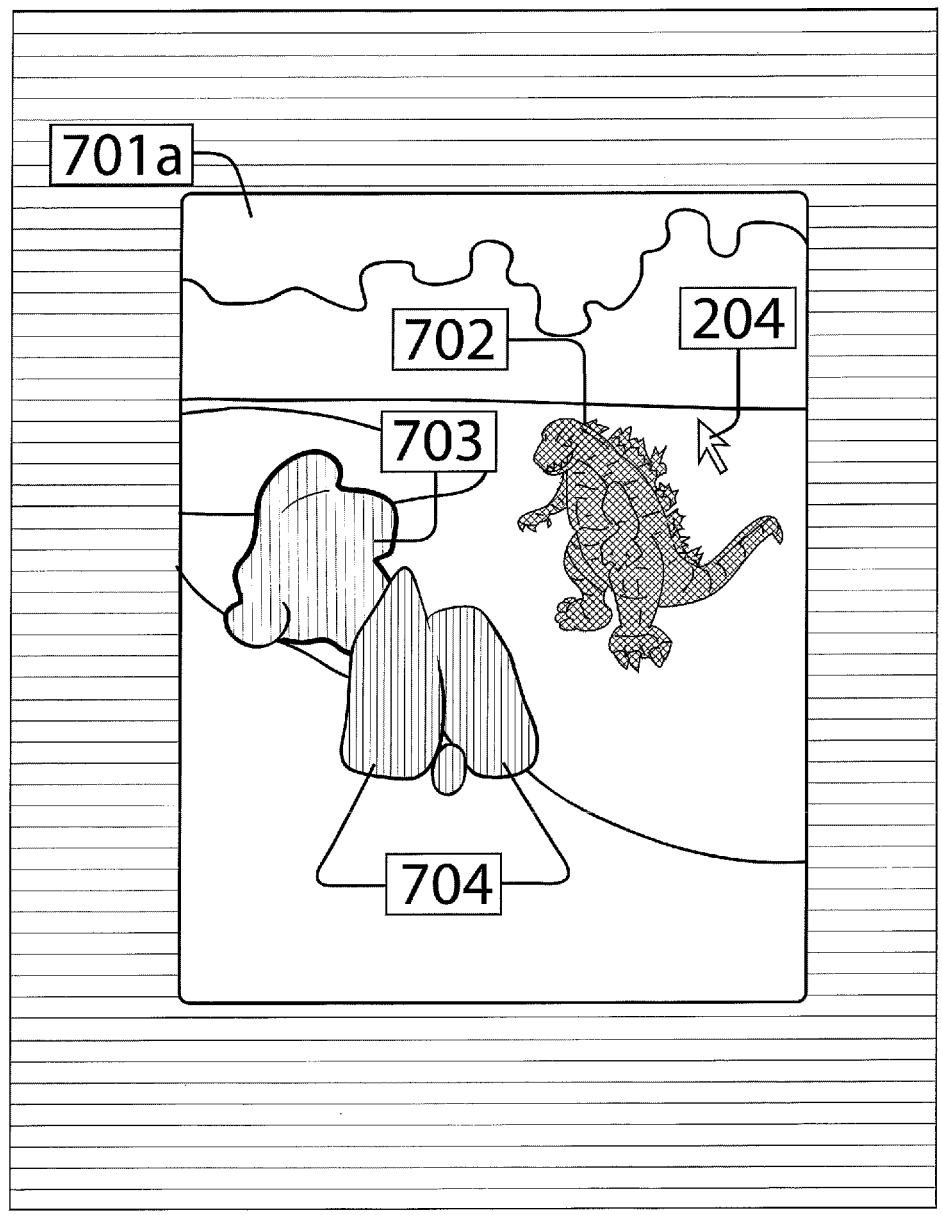
FIGS. 7a-7f illustrate certain aspects of an embodiment of the present invention.

FIGS. 7a-7d illustrate a sequence of display states that may follow from a sequence of user actions in an application that embodies one or more aspects of the invention. FIG. 7a shows a scene 701a including such graphical objects as lizard 702, boulder group 703 and boulder group 704. Also shown is user input pointer 204. These same graphical objects appear in FIGS. 7b-7f, 8 and 9, under various modifications of their state. In FIG. 7a, the position of user input pointer 204 outside the boundaries of graphical objects 702-704, indicating a lack of selection of these objects by the user.

Figure 7B:
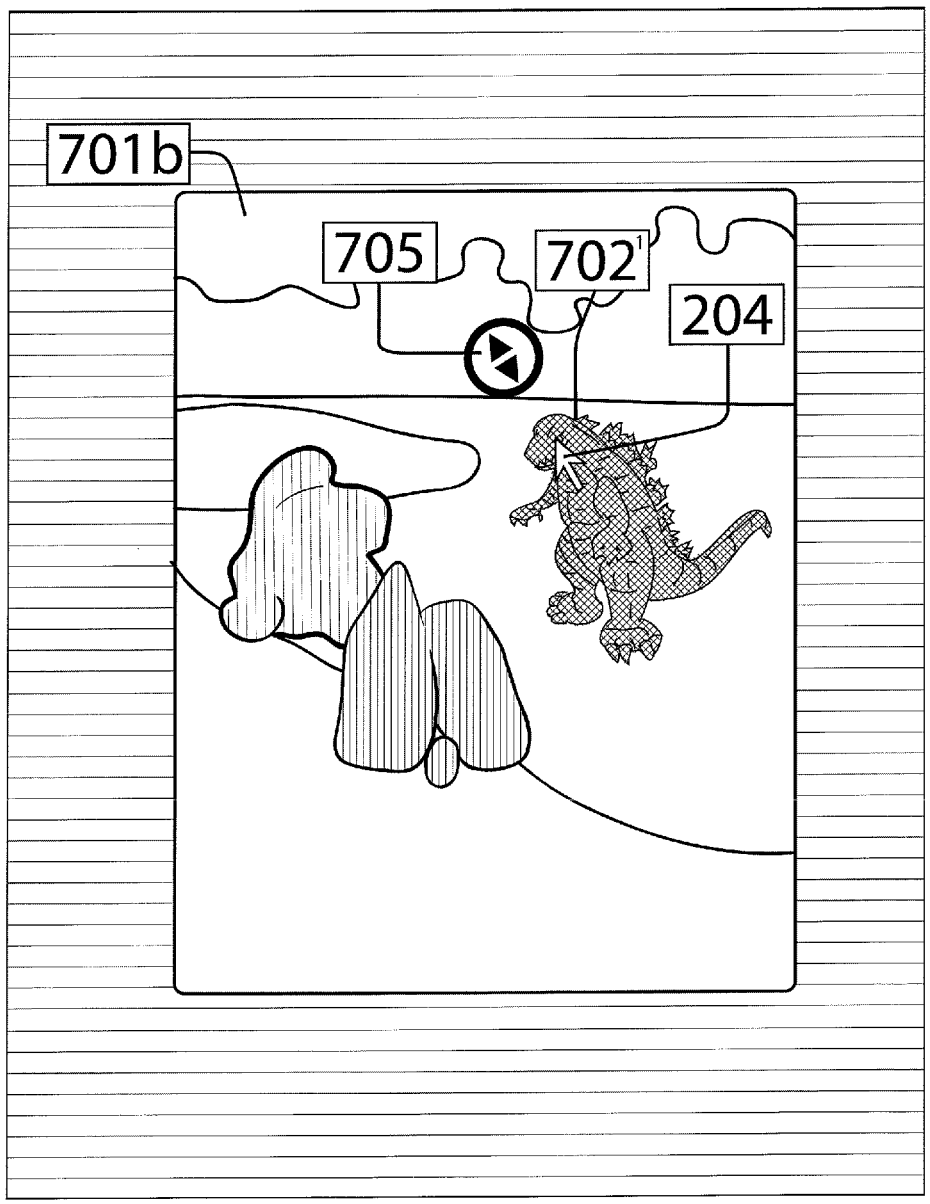

In FIG. 7b, an aspect of an embodiment of the present invention is illustrated. This figure may indicate a time evolution from FIG. 7a in which the user has caused user input pointer 204 to move to a position contained within the visible boundary of lizard 702. Such repositioning of pointer 204 may indicate the selection of lizard 702 by the user for manipulation. An embodiment of the invention may indicate such selection by adding an object overlay not individually shown in FIG. 7b for clarity) which overlays lizard 702 from FIG. 7a and results in the composite lizard 702'. In FIG. 7b, the visual rendering of composite lizard 702' is slightly altered from that of lizard 702 in FIG. 7a, with the infill coloration of the composite 702' lightened and the detail strokes pronounced. Such visual effects may provide clues to the user that lizard 702 has been selected by the repositioning of pointer 204.

Various visual effects shown in FIG. 7b may be caused by the insertion of a graphical overlay object that has the same boundary as lizard 702, that has black detail strokes identical to those shown for lizard 702, that has solid white infill coloration or patterning, and that has an opacity of 80% (i.e., 20% transparency) applied uniformly to the boundary and detail strokes and infill of the overlay. As will be understood by those skilled in the art, the effect of such an overlay will be to give the appearance of having "lightened" the infill coloration of lizard 702 while preserving the color value of the detail and boundary strokes, thereby making these strokes more pronounced in the composite rendering 702'. (In FIG. 7f a "detail stroke" and a "boundary stroke" have been labeled to make clear the usage of this terminology, with detail stroke 709 representing the eye of composite lizard 702' and boundary stroke 708 outlining part of the head of composite lizard 702'). FIG. 7b also illustrates that the user selection of lizard 702 may additionally be indicated by other means, such as the appearance of resize instrumentality 705.

Figure 7C:
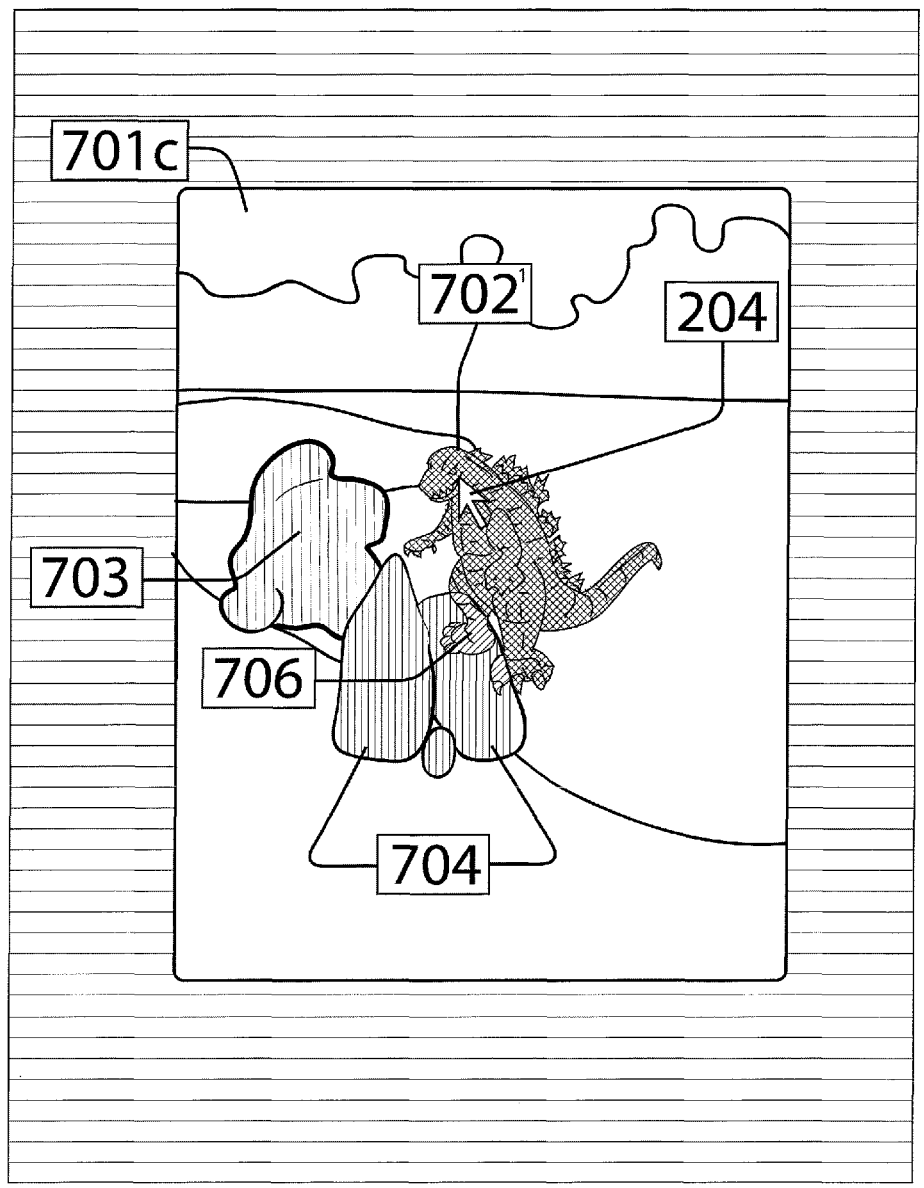
Figure 7D:
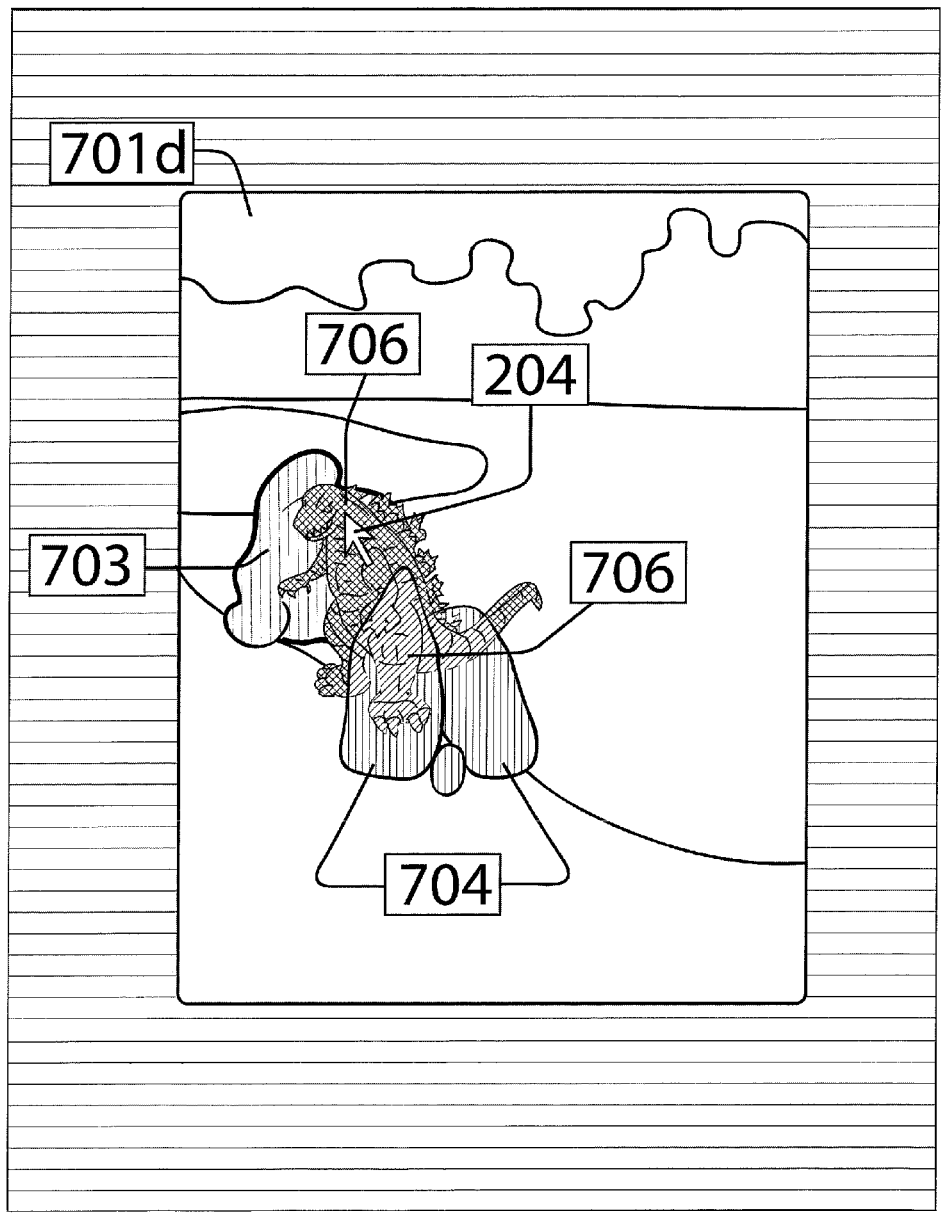

FIG. 7c and FIG. 7d show an evolution of scene 701b from the state shown in FIG. 7b to scenes 701c and then 701d. In this sequence, the user has commenced a drag operation, e.g., by depressing and holding depressed a mouse button and then moving the mouse, dragging composite lizard 702' across scene 701c to the left. In this example, the underlying lizard 702 occupies an image stacking layer between those of boulder group 703 and boulder group 704, and the overlay occupies the same x-y region as the underlying lizard but in a stacking layer that is above the underlying lizard 702 and the boulder groups 703 and 704. In FIG. 7c and FIG. 7d lizard 702 becomes partially and increasingly occluded by boulder group 704, and boulder group 703 becomes partially occluded by the lizard 702. These figures illustrate that the composite lizard 702' retains the original graphical object, underlying lizard 702, in its proper stacking layer, with the overlay graphical object occupying x-y screen coordinates identical to lizard 702 but in a stacking layer that is above that of boulder group 704. The overlay 706 therefore, becomes clearly visible at the points of screen overlap of lizard 702 and boulder group 704. In other words, a portion of lizard 702 not viewable because it is in a lower layer than boulder group 704 but the overlay 706 is visible since it occupies a layer above the boulder group 704. The composite lizard 702' conveys that lizard is behind boulder group 704 but faintly visible through boulder group 704.

Figure 7E:
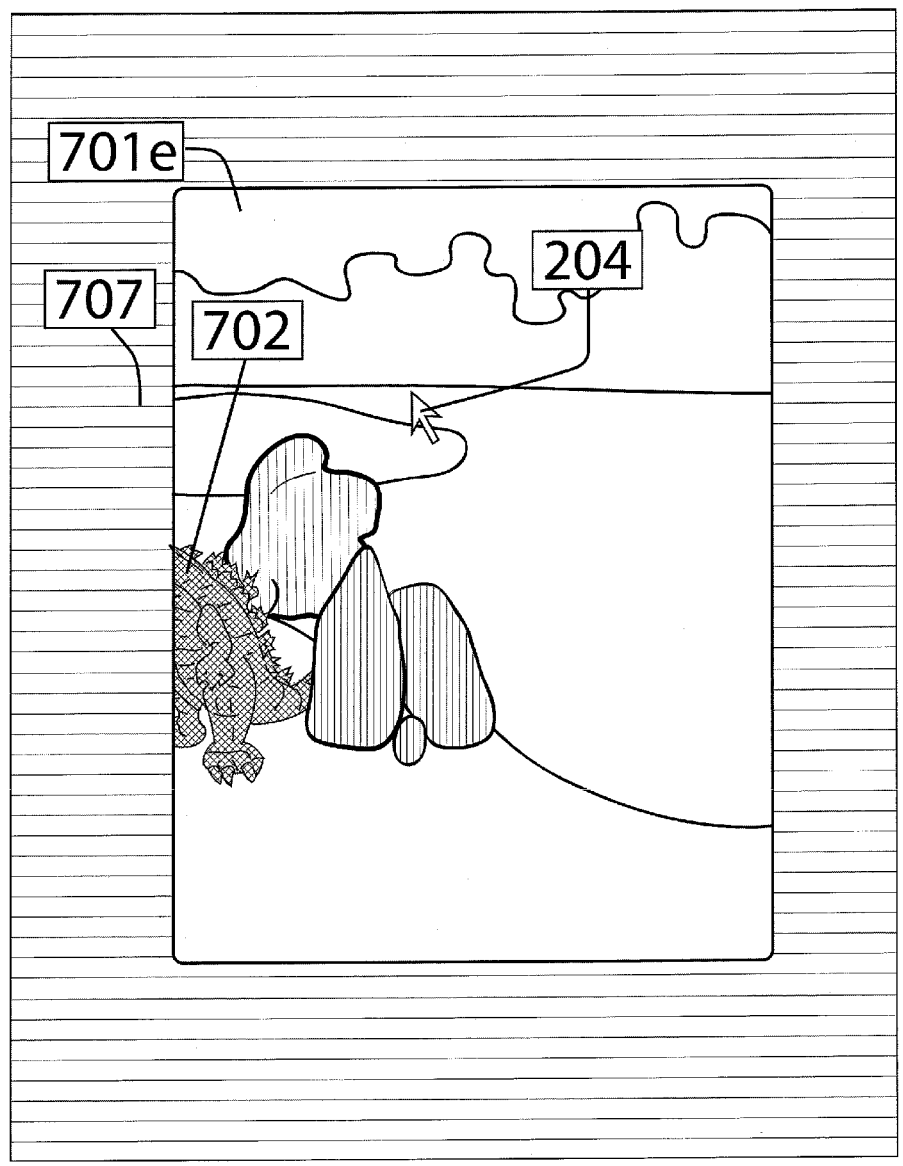

In FIG. 7e, the user has dragged lizard 702 to the left, beyond the position shown in FIG. 7d and then dropped lizard 702, e.g., by releasing a formerly held mouse button. In this state, lizard 702 now almost entirely occludes boulder group 703, is slightly occluded by boulder group 704, and is to a large extent hidden outside of the boundaries of scene 701e. In this state as illustrated, the overlay may have been deleted or hidden in accordance with an embodiment of the invention, indicating that lizard 702 is neither selected nor being dragged. Also illustrated in FIG. 7e is a region around the exterior perimeter of scene 701 identified herein as mat 707. The terminology "mat" has been chosen by analogy to the mat used in the framing of a piece of fine art, with the artwork underlying the mat, much as scene 701 and its graphical objects 702-704 may underlay mat 707 in their stacking order. In FIG. 7e, graphical object lizard 702 partially underlies graphical object mat 707 and the underlying portion of lizard 702 is therefore not rendered to the screen, mat 707 in the illustrated example being pure white and fully opaque. As illustrated in FIG. 7e, lizard 702 may thus be made difficult to identify, the face of lizard 702 being fully occluded and hidden from the user.

Figure 7F:
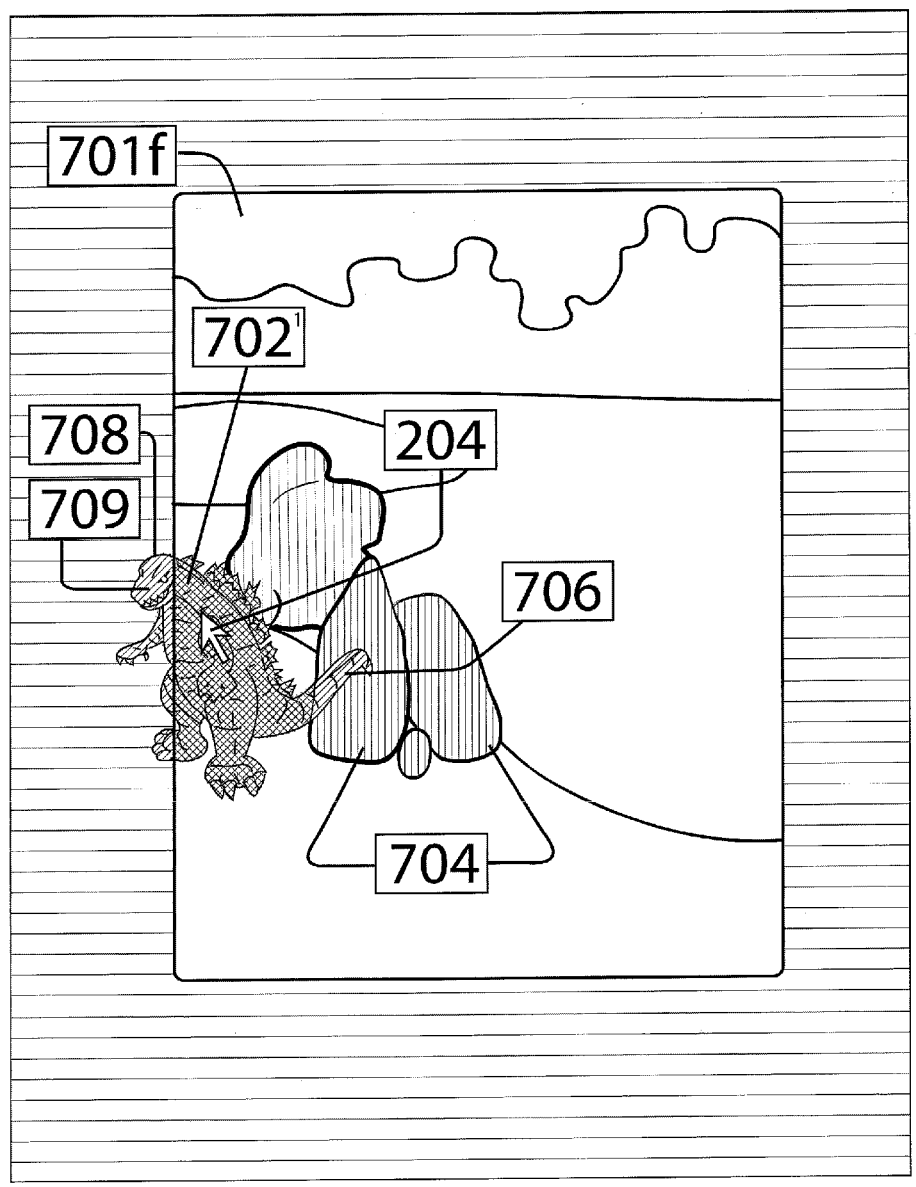

FIG. 7f shows an evolution of scene 701e from the state shown in FIG. 7e to scene 701f. In this sequence, the user has caused user input pointer 204 to move from a screen position outside of the region occupied by graphical object lizard 702 to a screen position inside that region. By doing so the user may have acted to select lizard 702. In FIG. 7f, an embodiment of the invention has indicated the state of selection of lizard 702 by creating or remaking visible an overlay and thereby rendering composite lizard 702'. This may create a visual transition similar to that seen between FIG. 7a and FIG. 7b in the appearance of lizard 702 to composite lizard 702' in FIG. 7b. Additionally, the appearance of the overlay component of the composite lizard 702' above boulder group 704 and mat 707 conveys that lizard 702 is now faintly visible through these objects. Also, with the face of lizard including boundary stroke 708 and detail stroke 709 now presented to the user, the user may more easily identify the selected object 702 as being an image of a particular lizard.

Figure 8:
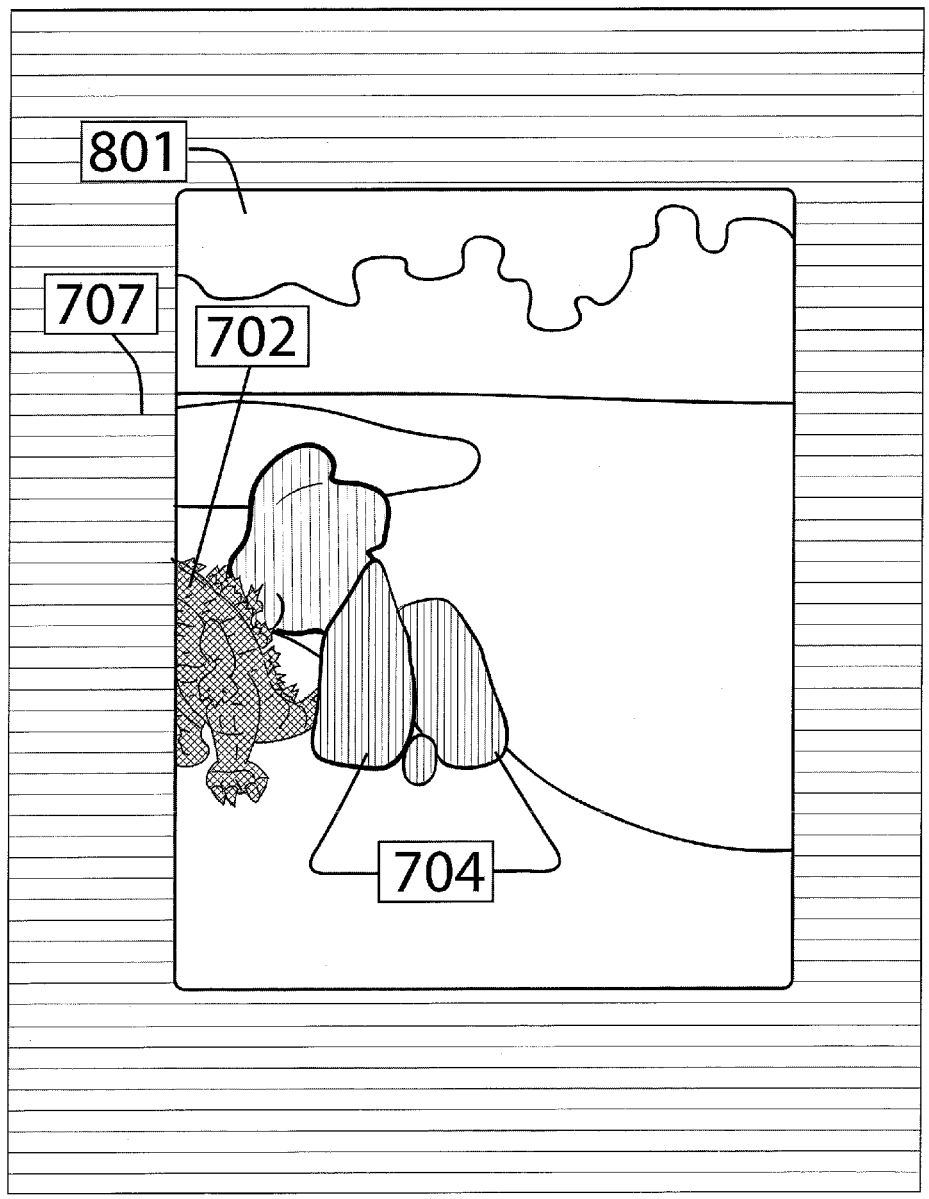
FIGS. 8 and 9 illustrate prior art approaches.
Figure 9:
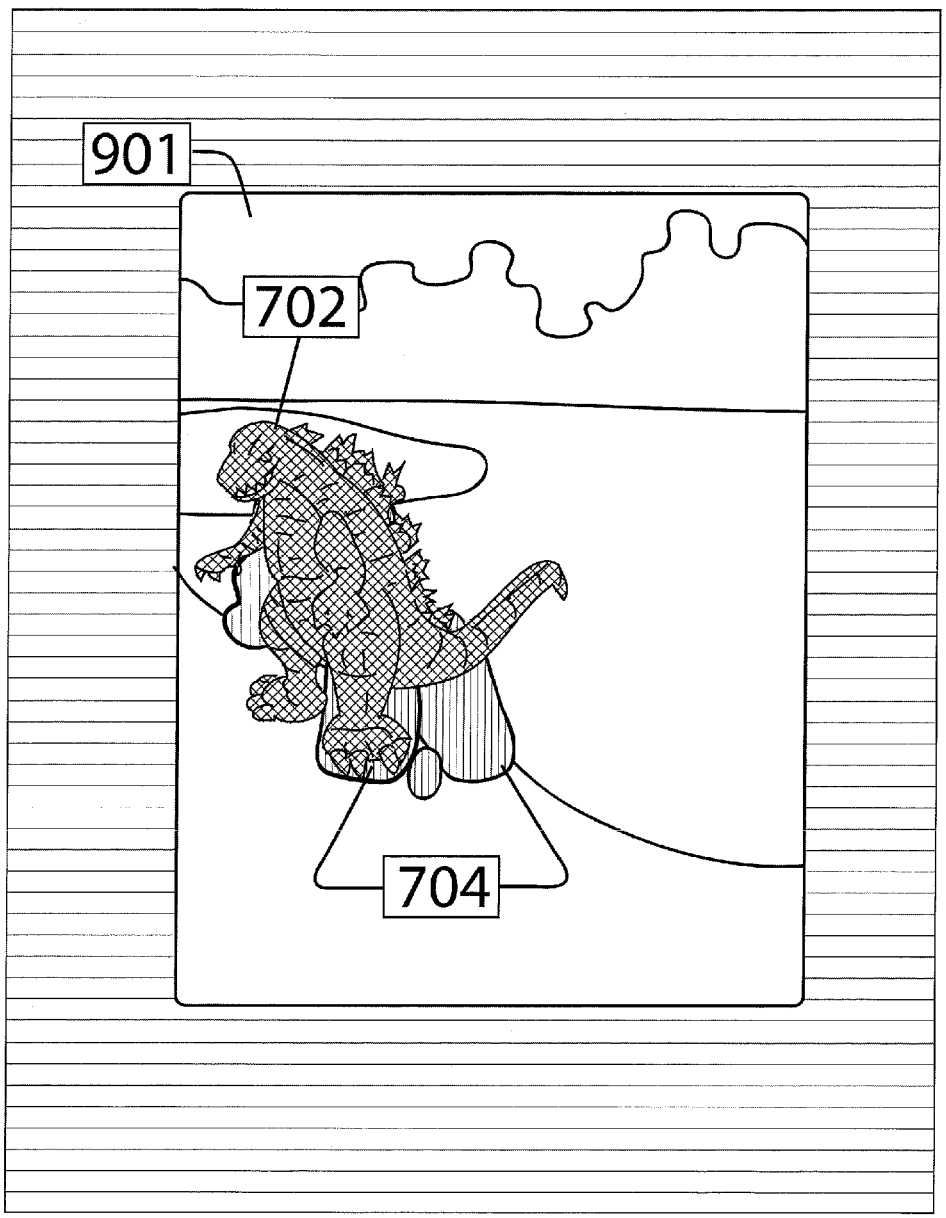

FIG. 8 and FIG. 9 illustrate a drag operation of lizard 702, as might conventionally be done in one of two styles in the absence of the present invention. In FIG. 8, the graphical object being dragged (lizard 702) is maintained in its stacking order during the drag operation and is therefore occluded by boulder group 704 and mat 707, making placement difficult. In FIG. 9 the graphical object being dragged (lizard 702) is brought to the topmost stacking layer during the drag operation and then "snaps" back to its proper stacking layer upon drop (i.e., to a GUI state analogous to the one shown in FIG. 8).

Those skilled in the art will understand that embodiments of the invention may also be usefully employed in operations during which the user is moving one or more objects from one or more layers to one or more other layers. Such operations may be accomplished through menu choices, layer palettes, or similar mechanisms. In an embodiment of the invention, transitions between layers may also be briefly animated in the event that the user selects a control that otherwise effects graphical object layering.

Those skilled in the art will also realize that while the appearance of transparency of intervening objects may be effected, as described in the foregoing text, by creating an object overlay (as per overlay 108) that occupies a layer above all intervening objects, other embodiments of the present invention may deliver similar effects by adjusting the opacity of all intervening objects, or similar manipulations.

Those skilled in the art will also realize that some of the visual effects and mechanisms to achieve the same that have been described in this disclosure may be used beneficially in graphics applications in contexts beyond those immediately related to stacking order, e.g., to indicate the selection of a single unstacked graphical object through the addition of a non-object-identical overlay.

In order to provide additional context for implementing various aspects of the present invention, FIG. 5 and the following discussion is intended to provide a brief, general description of a suitable computing environment 500 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

With reference to FIG. 5, an example system environment 500 for implementing the various aspects of the invention includes a conventional computer 502, including a processing unit 504, a system memory 506, and a system bus 508 that couples various system components, including the system memory, to the processing unit 504. The processing unit 504 may be any commercially available or proprietary processor. In addition, the processing unit may be implemented as multi-processor formed of more than one processor, such as may be connected in parallel.

The system bus 508 may be any of several types of bus structure including a memory bus or memory controller, a peripheral bus, and a local bus using any of a variety of conventional bus architectures such as PCI, VESA, Microchannel, ISA, and EISA, to name a few. The system memory 506 includes read only memory (ROM) 510 and random access memory (RAM) 512. A basic input/output system (BIOS) 514, containing the basic routines that help to transfer information between elements within the computer 502, such as during start-up, is stored in ROM 510.

The computer 502 also may include, for example, a hard disk drive 516, a magnetic disk drive 518, e.g., to read from or write to a removable disk 520, and an optical disk drive 522, e.g., for reading from or writing to a CD-ROM disk 524 or other optical media. The hard disk drive 516, magnetic disk drive 518, and optical disk drive 522 are connected to the system bus 508 by a hard disk drive interface 526, a magnetic disk drive interface 528, and an optical drive interface 530, respectively. The drives 516-522 and their associated computer-readable media provide nonvolatile storage of data, data structures, computer-executable instructions, etc. for the computer 502. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 500, and further that any such media may contain computer-executable instructions for performing the methods of the present invention.

A number of program modules may be stored in the drives 516-522 and RAM 512, including an operating system 532, one or more application programs 534, other program modules 536, and program data 538. The operating system 532 may be any suitable operating system or combination of operating systems. By way of example, the application programs 534 and program modules 536 can include an information searching scheme in accordance with an aspect of the present invention.

A user can enter commands and information into the computer 502 through one or more user input devices, such as a keyboard 540 and a pointing device (e.g., a mouse 542). Other input devices (not shown) may include a microphone, a joystick, a game pad, a satellite dish, a wireless remote, a scanner, or the like. These and other input devices are often connected to the processing unit 504 through a serial port interface 544 that is coupled to the system bus 508, but may be connected by other interfaces, such as a parallel port, a game port or a universal serial bus (USB). A monitor 546 or other type of display device is also connected to the system bus 508 via an interface, such as a video adapter 548. In addition to the monitor 546, the computer 502 may include other peripheral output devices (not shown), such as speakers, printers, etc.

It is to be appreciated that the computer 502 can operate in a networked environment using logical connections to one or more remote computers 560. The remote computer 560 may be a workstation, a server computer, a router, a peer device or other common network node, and typically includes many or all of the elements described relative to the computer 502, although for purposes of brevity, only a memory storage device 562 is illustrated in FIG. 5. The logical connections depicted in FIG. 5 can include a local area network (LAN) 564 and a wide area network (WAN) 566. Such networking environments are commonplace in offices, enterprise-wide computer networks, intranets and the Internet. When used in a LAN networking environment, for example, the computer 502 is connected to the local network 564 through a network interface or adapter 568. When used in a WAN networking environment, the computer 502 typically includes a modem (e.g., telephone, DSL, cable, etc.) 570, or is connected to a communications server on the LAN, or has other means for establishing communications over the WAN 566, such as the Internet. The modem 570, which can be internal or external relative to the computer 502, is connected to the system bus 508 via the serial port interface 544. In a networked environment, program modules (including application programs 534) and/or program data 538 can be stored in the remote memory storage device 562. It will be appreciated that the network connections shown are exemplary and other means (e.g., wired or wireless) of establishing a communications link between the computers 502 and 560 can be used when carrying out an aspect of the present invention.

In accordance with the practices of persons skilled in the art of computer programming, the present invention has been described with reference to acts and symbolic representations of operations that are performed by a computer, such as the computer 502 or remote computer 560, unless otherwise indicated. Such acts and operations are sometimes referred to as being computer-executed. It will be appreciated that the acts and symbolically represented operations include the manipulation by the processing unit 504 of electrical signals representing data bits which causes a resulting transformation or reduction of the electrical signal representation, and the maintenance of data bits at memory locations in the memory system (including the system memory 506, hard drive 516, floppy disks 520, CD-ROM 524, and remote memory 562) to thereby reconfigure or otherwise alter the computer system's operation, as well as other processing of signals. The memory locations where such data bits are maintained are physical locations that have particular electrical, magnetic, or optical properties corresponding to the data bits.

It will be appreciated by those skilled in the art that the inventive GUI methods described in this invention will be programmed in a software language such as C++, JAVA, ACTIONSCRIPT, JAVASCRIPT, VISUAL BASIC®, HTML or other languages. The GUIs will be able to be manipulated by a user of the software using an input device, such as a mouse, touch sensitive pad, or other mechanism. In addition to the example arrangement depicted in FIG. 5, the various embodiments of the invention may be implemented, in whole or in part on a server, a vehicle-mounted electronic device, or a hand-held electronic device, for example.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While there have been shown and described and pointed out certain novel features of the present invention as applied to preferred embodiments thereof, it will be understood by those skilled in the art that various omissions and substitutions and changes in the methods and apparatus described herein, and in their operation, may be made by those skilled in the art without departing from the spirit and scope of the invention. It is expressly intended that all combinations of those elements and/or method steps which perform substantially the same function in substantially the same way to achieve the same results are within the scope of the invention. Substitutions of method steps and elements from one described embodiment to another are also fully intended and contemplated. It is the intention, therefore, to be limited only as indicated by the scope of the claims appended hereto.

What is claimed is:

1. A processor-based method for displaying graphical design artworks, comprising:
    displaying first and second graphical design artworks in a first state and in a graphics design application program, wherein in the first state a portion of the second graphical design artwork that is overlapped by a portion of the first graphical design artwork is completely obstructed from view by the portion of the first graphical design artwork; and
    displaying the first and second graphical design artwork in a second state and in the graphics design application program, wherein in the second state the portion of the second graphical design artwork that is overlapped by the portion of the first graphical design artwork is represented as being visible along with the portion of the first graphical design artwork and with fainted visibility relative to a portion of the second graphical design artwork that is not overlapped by a portion of the first graphical design artwork;
    wherein the graphics design application program has a mat providing an exterior perimeter for surrounding a scene, and the scene providing an interior perimeter for surrounding the first graphical design artwork and the second graphical design artwork;
    wherein, in response to a selection of at least one of the first graphical design artwork and the second graphical design artwork, displaying an extended portion of the at least one of the first graphical design artwork and the second graphic design artwork extending outside of the scene and into the mat as being visible in the mat with fainted visibility relative to an unextended portion of the at least one of the first graphical design artwork and the second graphical design artwork, wherein the selection occurs while displaying the unextended portion of the at least one of the first graphical design artwork and the second graphical design artwork.

2. The method of claim 1, wherein the second state further occurs in response to the selection of the second graphical design artwork.

3. The method of claim 1, wherein the second state further occurs in response to changing of a stacking order of the second graphical design artwork relative to the other graphical design artworks.

4. The method of claim 1, further comprising:
    assigning the graphical design artworks to stacking layers, wherein the first graphical design artwork is assigned to a stacking layer that is above a stacking layer to which the second graphical design artwork is assigned;
    wherein the step of displaying the first and second graphical design artworks in the second state includes:
        assigning an overlay graphical design artwork of the second graphical design artwork to a stacking layer that is above the stacking layer to which the first graphical design artwork is assigned, wherein the overlay graphical design artwork has outline attributes that are consistent with outline attributes of the second graphical design artwork and fill attributes with a level of transparency that is greater than 0;
        displaying the overlay graphical design artwork at x-y coordinates corresponding to x-y coordinates at which the second graphical design artwork is displayed, wherein a portion of the overlay graphical design artwork overlaps the portion of the first graphical design artwork t that overlaps the portion of the second graphical design artwork, and the level of transparency of the fill attributes of the overlay graphical design artwork provide visibility of the portion of the first graphical design artwork that overlaps the portion of the second graphical design artwork.

5. The method of claim 4, wherein the second state further occurs in response to the selection of the second graphical design artwork.

6. The method of claim 4, wherein the second state further occurs in response to changing of a stacking layer of the second graphical design artwork relative to the other graphical design artworks.

7. The method of claim 4, further comprising:
    wherein the graphical design artworks including the first and second graphical design artworks are selectable for display from a library of user-selectable graphical design artworks; and
    selecting, in response to the second graphical design artwork transitioning from the first state to the second state, the overlay graphical design artwork from a library containing a plurality of overlay graphical design artworks corresponding to the user-selectable graphical design artworks.

8. The method of claim 1, wherein the second state occurs in response to a drag and drop operation of the second graphical design artwork.

9. An article of manufacture, comprising:
a non-transitory processor-readable medium having stored thereon executable instructions for displaying graphical design artworks by performing the steps including:
   displaying first and second graphical design artworks in a first state and in a graphics design application program, wherein in the first state a portion of the second graphical design artwork that is overlapped by a portion of the first graphical design artwork is completely obstructed from view by the portion of the first graphical design artwork; and
   displaying the first and second graphical design artworks in a second state and in the graphics design application program, wherein in the second state the portion of the second graphical design artwork that is overlapped by the portion of the first graphical design artwork is represented as being visible along with the portion of the first design artwork and with fainted visibility relative to a portion of the second graphical design artwork that is not overlapped by a portion of the first graphical design artwork;
   wherein the graphics design application program has a mat providing an exterior perimeter for surrounding a scene, and the scene providing an interior perimeter for surrounding the first graphical design artwork and the second graphical design artwork;
   wherein, in response to a selection of at least one of the first graphical design artwork and the second graphical design artwork, displaying an extended portion of the at least one of the first graphical design artwork and the second graphical design artwork extending outside of the scene and into the mat as being visible in the mat with muted fainted visibility relative to an unextended portion of the at least one of the first graphical design artwork and the second graphical design artwork, wherein the selection occurs while displaying the unextended portion of the at least one of the first graphical design artwork and the second graphical design artwork.

10. The article of manufacture of claim 9, wherein the second state further occurs in response to the selection of the second graphical design artwork.

11. The article of manufacture of claim 9, wherein the second state further occurs in response to changing of a stacking order of the second graphical design artwork relative to the other graphical design artworks.

12. The article of manufacture of claim 9, the steps further comprising:
   assigning the graphical design artworks to stacking layers, wherein the first graphical design artwork is assigned to a stacking layer that is above a stacking layer to which the second graphical design artwork is assigned;
   wherein the step of displaying the first and second graphical design artworks in the second state includes:
   assigning an overlay graphical design artwork of the second graphical design artwork to a stacking layer that is above the stacking layer to which the first graphical design artwork is assigned, wherein the overlay graphical design artwork has outline attributes that are consistent with outline attributes of the second graphical design artwork and fill attributes with a level of transparency that is greater than 0;
   displaying the overlay graphical design artwork at x-y coordinates corresponding to x-y coordinates at which the second graphical design artwork is displayed, wherein a portion of the overlay graphical design artwork overlaps the portion of the first graphical design artwork that overlaps the portion of the second graphical design artwork, and the level of transparency of the fill attributes of the overlay graphical design artwork provide visibility of the portion of the first graphical design artwork that overlaps the portion of the second graphical design artwork.

13. The article of manufacture of claim 12, wherein the second state further occurs in response to the selection of the second graphical design artwork.

14. The article of manufacture of claim 12, wherein the second state further occurs in response to changing of a stacking layer of the second graphical design artwork relative to the other graphical design artworks.

15. The article of manufacture of claim 12, the steps further comprising:
   wherein the graphical design artworks including the first and second graphical design artworks are selectable for display from a library of user-selectable graphical design artworks; and
   selecting, in response to the second graphical design artwork transitioning from the first state to the second state, the overlay graphical design artwork from a library containing a plurality of overlay graphical design artworks corresponding to the user-selectable graphical design artworks.

16. The article of manufacture of claim 9, wherein the second state occurs in response to a drag and drop operation of the second graphical design artwork.

17. An electronic system, comprising:
   a monitor;
   a processor coupled to the monitor; and
   a memory arrangement coupled to the processor;
   wherein the memory arrangement is configured with instructions that when executed by the processor cause the processor to perform the steps including:
   outputting for display on the monitor first and second graphical design artworks in a first state and in a graphics design application program, wherein in the first state a portion of the second graphical design artwork that is overlapped by a portion of the first graphical design artwork is completely obstructed from view by the portion of the first graphical design artwork; and
   outputting for display on the monitor the first and second graphical design artworks in a second state and in the graphics design application program, wherein in the second state the portion of the second graphical design artwork that is overlapped by the portion of the first graphical design artwork is represented as being visible along with the portion of the first design artwork and with fainted visibility relative to a portion of the second graphical design artwork that is not overlapped by a portion of the first graphical design artwork;
   wherein the graphics design application program has a mat providing an exterior perimeter for surrounding a scene, and the scene providing an interior perimeter for surrounding the first graphical design artwork and the second graphical design artwork;
   wherein, in response to a selection of at least one of the first graphical design artwork and the second graphical design artwork, displaying an extended portion of the at least one of the first graphical design artwork and the second graphical design artwork extending outside of the scene and into the mat as being visible in the mat with muted fainted visibility relative to an unextended portion of the at least one of the first graphical design artwork and the second graphical design artwork, wherein the selection occurs while displaying the unextended portion of the at least one of the first graphical design artwork and the second graphical design artwork.

18. The electronic system of claim 17, wherein the second state occurs in response to a drag and drop operation of the second graphical design artwork.

19. An apparatus for displaying graphical design artworks, comprising:
   means for displaying first and second graphical design artworks in a first state and in a graphics design application program, wherein in the first state a portion of the second graphical design artwork that is overlapped by a portion of the first graphical design artwork is completely obstructed from view by the portion of the first graphical design artwork; and
   means for displaying the first and second graphical design artworks in a second state and in the graphics design application program, wherein in the second state the portion of the second graphical design artwork that is overlapped by the portion of the first graphical design artwork is represented as being visible along with the portion of the first design artwork and with fainted visibility relative to a portion of the second graphical design artwork that is not overlapped by a portion of the first graphical design artwork;
   wherein the graphics design application program has a mat providing an exterior perimeter for surrounding a scene, and the scene providing an interior perimeter for surrounding the first graphical design artwork and the second graphical design artwork;
   wherein, in response to a selection of at least one of the first graphical design artwork and the second graphical design artwork, displaying an extended portion of the at least first graphical design artwork and the second graphical design artwork extending outside of the scene and into the mat as being visible in the mat with fainted visibility relative to an unextended portion of the at least one of the first graphical design artwork and the second graphical design artwork, wherein the selection occurs while displaying the unextended portion of the at least one of the first graphical design artwork and the second graphical design artwork.

20. The apparatus of claim 19, wherein the second state occurs in response to a drag and drop operation of the second graphical design artwork.

* * * * *

UNITED STATES PATENT AND TRADEMARK OFFICE
CERTIFICATE OF CORRECTION

| | |
|---|---|
| PATENT NO. | : 8,947,452 B1 |
| APPLICATION NO. | : 11/999616 |
| DATED | : February 3, 2015 |
| INVENTOR(S) | : Jonathan B. Ballagh |

It is certified that error appears in the above-identified patent and that said Letters Patent is hereby corrected as shown below:

In the Claims,

Column 13, line 33, Claim 9, "muted fainted" should be changed to --fainted--

Column 14, line 66, Claim 17, "muted fainted" should be changed to --fainted--

Signed and Sealed this
Eighteenth Day of August, 2015

Michelle K. Lee
*Director of the United States Patent and Trademark Office*